(12) United States Patent
Hsu et al.

(10) Patent No.: US 11,695,233 B2
(45) Date of Patent: Jul. 4, 2023

(54) CHARGING COUPLER

(71) Applicant: DELTA ELECTRONICS, INC., Taoyuan (TW)

(72) Inventors: Jui-Yuan Hsu, Taoyuan (TW); Hung-Sheng Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 64 days.

(21) Appl. No.: 17/385,250

(22) Filed: Jul. 26, 2021

(65) Prior Publication Data
US 2022/0166161 A1 May 26, 2022

(30) Foreign Application Priority Data

Nov. 24, 2020 (CN) .......................... 202011330930.5

(51) Int. Cl.
*H01R 13/40* (2006.01)
*H01R 13/52* (2006.01)
(Continued)

(52) U.S. Cl.
CPC .......... *H01R 13/5205* (2013.01); *B60L 53/16* (2019.02); *H01R 13/6275* (2013.01); *H01R 43/005* (2013.01); *H01R 2201/26* (2013.01)

(58) Field of Classification Search
CPC ............ H01R 13/5205; H01R 13/6275; H01R 43/005; H01R 2201/26; B60L 53/16
(Continued)

(56) References Cited

U.S. PATENT DOCUMENTS 4,492,816 A 1/1985 Morel et al.
4,712,285 A 12/1987 Morel et al.
(Continued)

FOREIGN PATENT DOCUMENTS

CN 207691091 U 8/2018
CN 210985073 U 7/2020
(Continued)

OTHER PUBLICATIONS

Office Action dated Jul. 14, 2021 of the corresponding Taiwan patent application No. 109141161.
(Continued)

*Primary Examiner* — Abdullah A Riyami
*Assistant Examiner* — Vladimir Imas
(74) *Attorney, Agent, or Firm* — Chun-Ming Shih; HDLS IPR Services (57) ABSTRACT

A charging coupler has a grip, an electrical connector and a cable holder. The grip has a front opening and a rear opening on two ends thereof The grip has a first half-tube and a second half-tube connected with each other along a longitudinal direction thereof. The first half-tube has a first latch portion and a groove extending along edges thereof to connect the second half-tube. The second half-tube has a second latch portion and a rib extending along edges thereof to connect the first half-tube. The rib is substantially matched with the groove, and a sealant is filled in a gap between the rib and the groove. The first latch portion is latched with the second latch portion to tighten connection of the first half-tube and the second half-tube. The electrical connector is arranged on the front opening, and the cable holder is arranged on the rear opening.

14 Claims, 10 Drawing Sheets

(51) Int. Cl.
*B60L 53/16* (2019.01)
*H01R 13/627* (2006.01)
*H01R 43/00* (2006.01)

(58) Field of Classification Search
USPC .......................................................... 439/587
See application file for complete search history.

(56) References Cited

U.S. PATENT DOCUMENTS

| | | | | |
|---|---|---|---|---|
| 5,803,760 | A * | 9/1998 | Ito | H01R 13/62933 439/350 |
| 8,016,607 | B2 * | 9/2011 | Brown, II | H01R 13/53 439/353 |
| 8,075,329 | B1 * | 12/2011 | Janarthanam | H01R 13/6272 439/304 |
| 8,573,994 | B2 * | 11/2013 | Kiko | B60L 3/0069 439/372 |
| 8,932,072 | B2 * | 1/2015 | Tamaki | B62J 43/16 439/345 |
| 9,358,005 | B2 * | 6/2016 | Shelton, IV | A61B 17/07292 |
| 9,445,813 | B2 * | 9/2016 | Shelton, IV | A61B 34/30 |
| 9,509,095 | B2 * | 11/2016 | Ohmura | B60L 53/16 |
| 9,649,110 | B2 * | 5/2017 | Parihar | A61B 17/07207 |
| 9,755,359 | B2 * | 9/2017 | Moseke | H01R 13/6275 |
| 9,799,983 | B2 * | 10/2017 | Lane | H01R 13/5205 |
| 10,014,615 | B2 * | 7/2018 | Mueller | H01R 13/436 |
| 10,118,496 | B2 * | 11/2018 | Chuang | H01R 13/5202 |
| 10,271,851 | B2 * | 4/2019 | Shelton, IV | A61B 17/1155 |
| 10,285,705 | B2 * | 5/2019 | Shelton, IV | A61B 17/0644 |
| 10,517,596 | B2 * | 12/2019 | Hunter | A61B 17/0682 |
| 10,765,427 | B2 * | 9/2020 | Shelton, IV | A61B 17/07207 |
| 10,779,824 | B2 * | 9/2020 | Shelton, IV | A61B 17/07207 |
| 11,180,253 | B1 * | 11/2021 | Seeley | B64U 10/25 |
| 11,224,428 | B2 * | 1/2022 | Scott | A61B 90/94 |
| 2012/0129378 | A1 * | 5/2012 | Kiko | B60L 53/31 362/555 |
| 2015/0295344 | A1 | 10/2015 | Sawada et al. | |
| 2016/0126681 | A1 | 5/2016 | Kawai et al. | |
| 2022/0140526 | A1 * | 5/2022 | Liu | H01R 13/5812 439/34 |

FOREIGN PATENT DOCUMENTS

| | | |
|---|---|---|
| JP | S5914312 A | 1/1984 |
| JP | 2015008099 A | 1/2015 |
| JP | 2016201326 A | 12/2016 |
| JP | 3217205 U | 7/2018 |
| TW | M536429 U | 2/2017 |

OTHER PUBLICATIONS

Office Action dated Dec. 14, 2021 of the corresponding European patent application No. 21183310.8.

Office Action dated May 17, 2022 of the corresponding Japan patent application No. 2021-105865.

* cited by examiner

CHARGING COUPLER

BACKGROUND

Technical Field

This disclosure relates to a charging coupler and in particular to a charging coupler waterproofed by sealant.

Related Art

A waterproof structure of a related charging coupler is usually a housing assembled by rivet or screw, and a junction between parts of the housing is sealed by a rubber ring. In order to meet higher waterproof requirement, an interior of the related grip is filled with glue to improve the waterproof performance of the related waterproof structure.

However, in a glue filling procedure of the charging coupler assembly process, the components of the charging coupler should be arranged into the housing in advance. Then the housing is closed and the glue is injected into the housing through a hole on the housing. Accordingly, it is difficult to perform the aforementioned assembly process through automated assembly process. Moreover, the filled glue may have some air gaps due to insufficient filling process, which may decrease the waterproof effect. Furthermore, it is also difficult to perform the automated rivet or screw assembling process.

Accordingly, the glue-filled waterproof structure of the related charging coupler not only increases manufacturing costs and the weight of the charging coupler, decreases the production yield rate, but is also difficult to be assembled through automated process.

In views of this, in order to solve the above disadvantage, the inventor studied related technology and provided a reasonable and effective solution in this disclosure.

SUMMARY

This disclosure provides a charging coupler waterproofed by sealant.

This disclosure provides a charging coupler having a grip, an electrical connector and a cable holder. The grip is in a tubular shape. A front opening is disposed on one end of the grip, a rear opening is disposed on the other end of the grip. The grip includes a first half-tube and a second half-tube sealed with each other along a longitudinal direction of the grip. A groove is disposed on the first half-tube and extended along an edge of the first half-tube to connect with the second half-tube. A first latch portion is arranged in the first half-tube. A rib is arranged in the second half-tube. The rib is extended along an edge of the second half-tube to connect with the first half-tube. A second latch portion is arranged in the second half-tube. The groove is filled with a sealant. The rib is inserted into the groove and the rib is substantially matched with the groove. A gap between the rib and the groove is filled with the sealant. The first latch portion is latched with the second latch portion to tighten connection of the first half-tube and the second half-tube. The electrical connector is arranged on the front opening of the grip. The cable holder is arranged on the rear opening of the grip.

According to the charging coupler of this disclosure, a positioning base protruding from an inner surface of the second half-tube is provided. A controller electrically connected to the electrical connector is arranged on the positioning base. A pressing block corresponding to the controller and protruding from an inner surface of the first half-tube is provided. The controller is pressed by the pressing block to be fixed on the positioning base. The charging coupler of this disclosure further has a rubber block and a switch. The rubber block is clamped between the first half-tube and the second half-tube. The switch is embedded in the rubber block and penetrates the rubber block to be exposed inside the grip and outside the grip. The switch is electrically connected with the controller. A hook is arranged on the grip. A middle segment of the hook is pivotally connected on an outer surface of the grip. A claw is formed on one end of the hook. The claw is disposed on a side of the electrical connector. The other end of the hook presses the switch when the hook is pivotally rotated to make the claw move away from the electrical connector.

According to the charging coupler of this disclosure, a tapered ring and a flange are arranged on an outer surface of the electrical connector. An inner tapered surface corresponding to the tapered ring is arranged on an inner surface of the grip. A rubber ring is clamped between the flange and an inner edge of the front opening. The inner tapered surface is attached on and abuts against the tapered ring to push the flange toward the front opening. A pin protruding from the inner surface of the grip is provided. The pin is inserted into the electrical connector along a lateral direction of the electrical connector. A gap is disposed between the pin and the electrical connector in a longitudinal direction of the electrical connector. One half of the inner tapered surface is located on the inner surface of the first half-tube, the other half of the inner tapered surface is located on the inner surface of the second half-tube.

According to the charging coupler of this disclosure, the rib is in contact with an outer side of an inner surface of the groove. The gap is disposed between the rib and an inner side of the inner surface of the groove.

According to the charging coupler of this disclosure, an inner edge of the rear opening of the grip is engaged with an outer surface of the cable holder. The charging coupler of this disclosure further has a cable. The cable is electrically connected to the electrical connector and penetrates through the cable holder to extend from inside of the grip to outside of the grip.

The charging coupler of this disclosure further has a plurality of cables. The electrical connector includes a sleeve and a terminal holder inserted in the sleeve. A plurality of positioning notches corresponding to the cables are disposed on an outer surface of the terminal holder. A plurality of terminals is respectively disposed on the cables, and each of the terminals is arranged correspondingly in each of the positioning notches. Each terminal is arranged correspondingly in each positioning notch. At least one arm latch is arranged on the terminal holder to latch the sleeve. A pin protruding from the inner surface of the grip is provided. The pin penetrates through the sleeve and is inserted into the terminal holder along a lateral direction of the electrical connector.

According to the charging coupler of this disclosure, the first latch portion is disposed adjacent to the groove, and the second latch portion is disposed adjacent to the rib.

According to the charging coupler of this disclosure, the grip is assembled by buckling instead of using screws, the groove of the grip is filled with the sealant, and the sealant is squeezed by the rib being inserted into the groove to seal the grip. Therefore, the waterproof performance of the grip is enhanced and the grip may be suitable for automatic assembly process. Furthermore, the assembly cost may be reduced.

BRIEF DESCRIPTION OF DRAWINGS

This disclosure can be more fully understood by reading the following detailed description of the embodiment, with reference made to the accompanying drawings.

DETAILED DESCRIPTION

Figure 1:
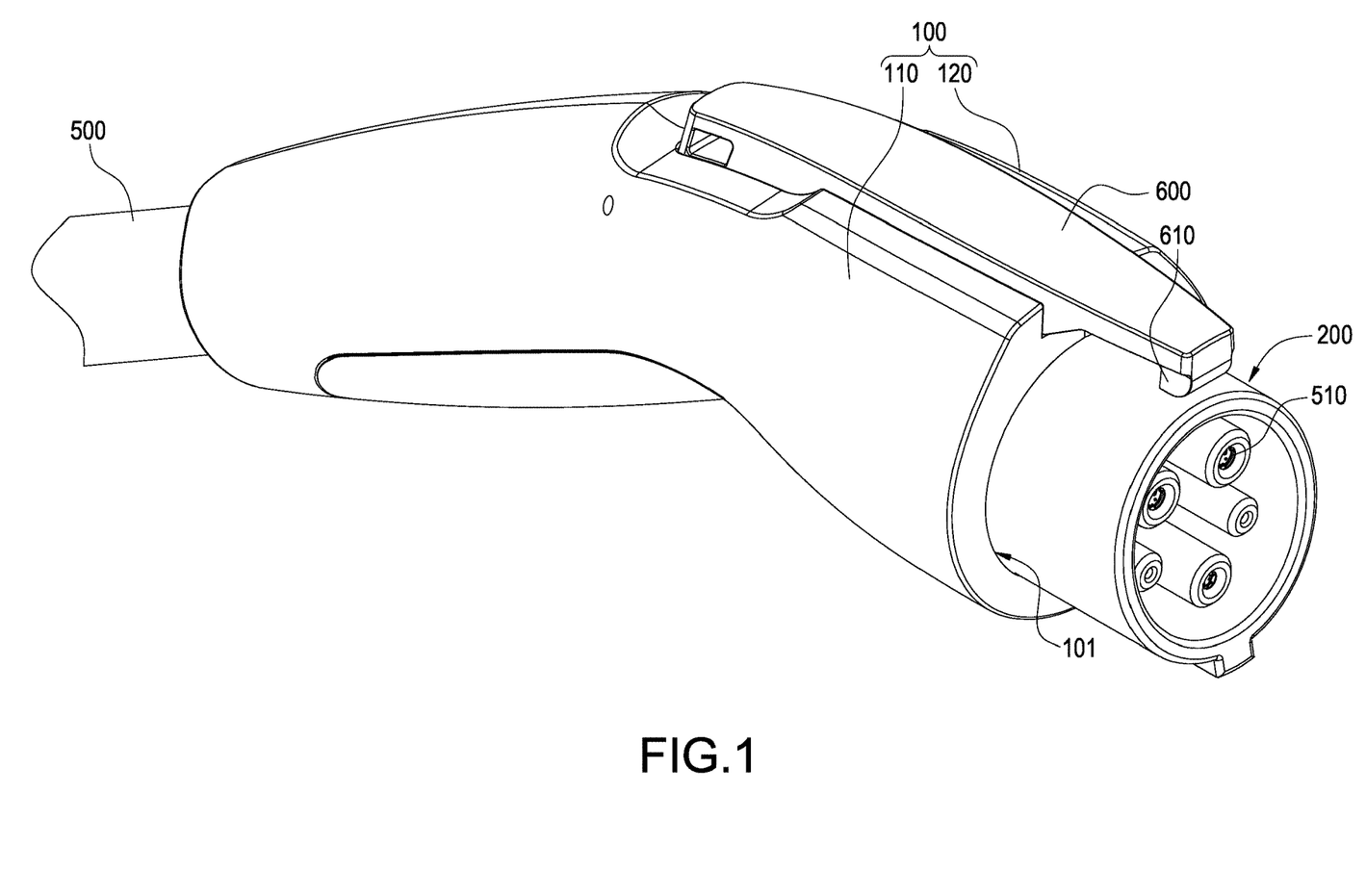
FIG. 1 is a perspective view showing an exemplary charging coupler according to an embodiment of this disclosure.
Figure 2:
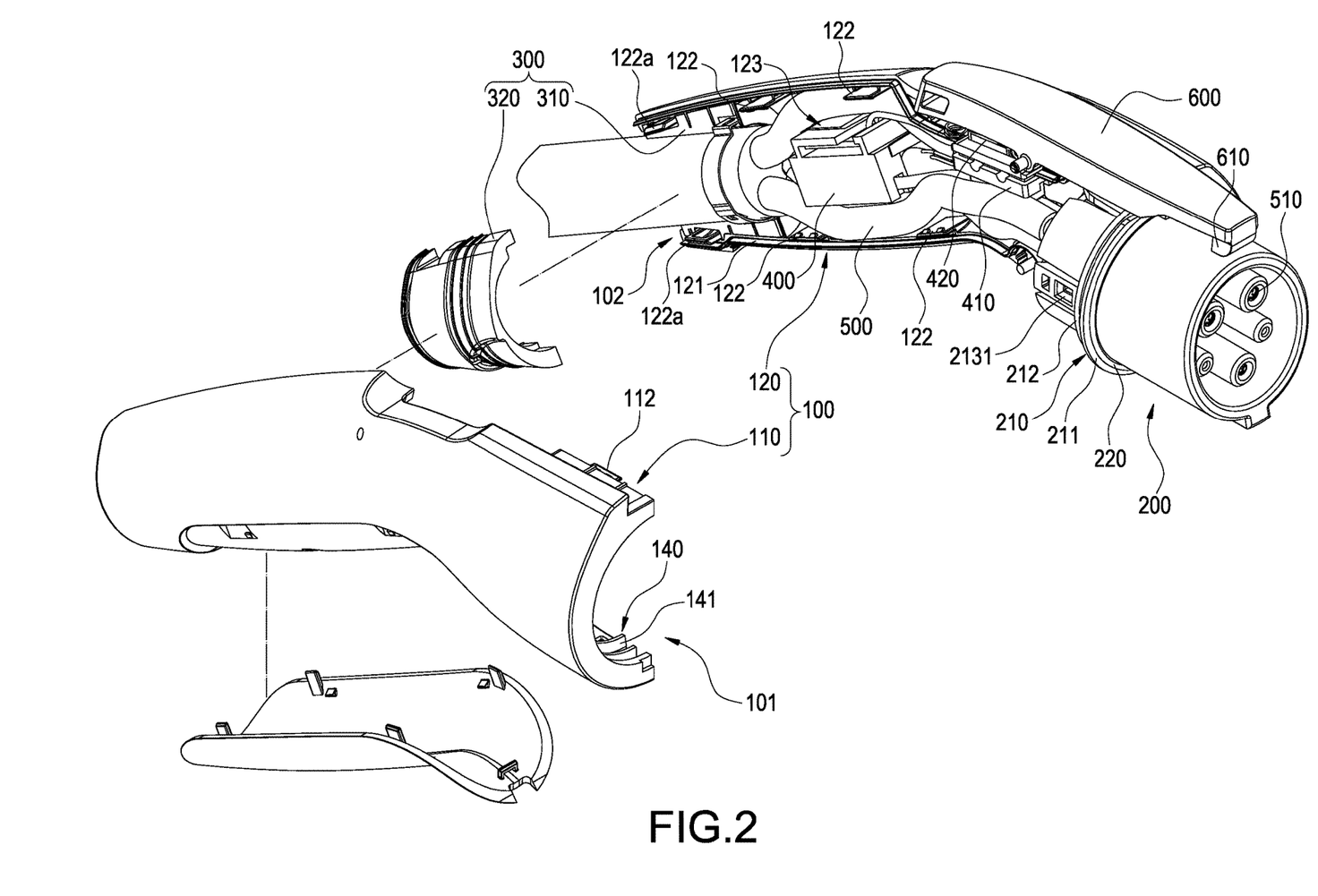
FIG. 2 to FIG. 5 is exploded views showing the exemplary charging coupler according to the embodiment of this disclosure.

With reference to FIG. 1 and FIG. 2, an embodiment of this disclosure provides a charging coupler having a grip 100, an electrical connector 200 and a cable holder 300.

Figure 3:
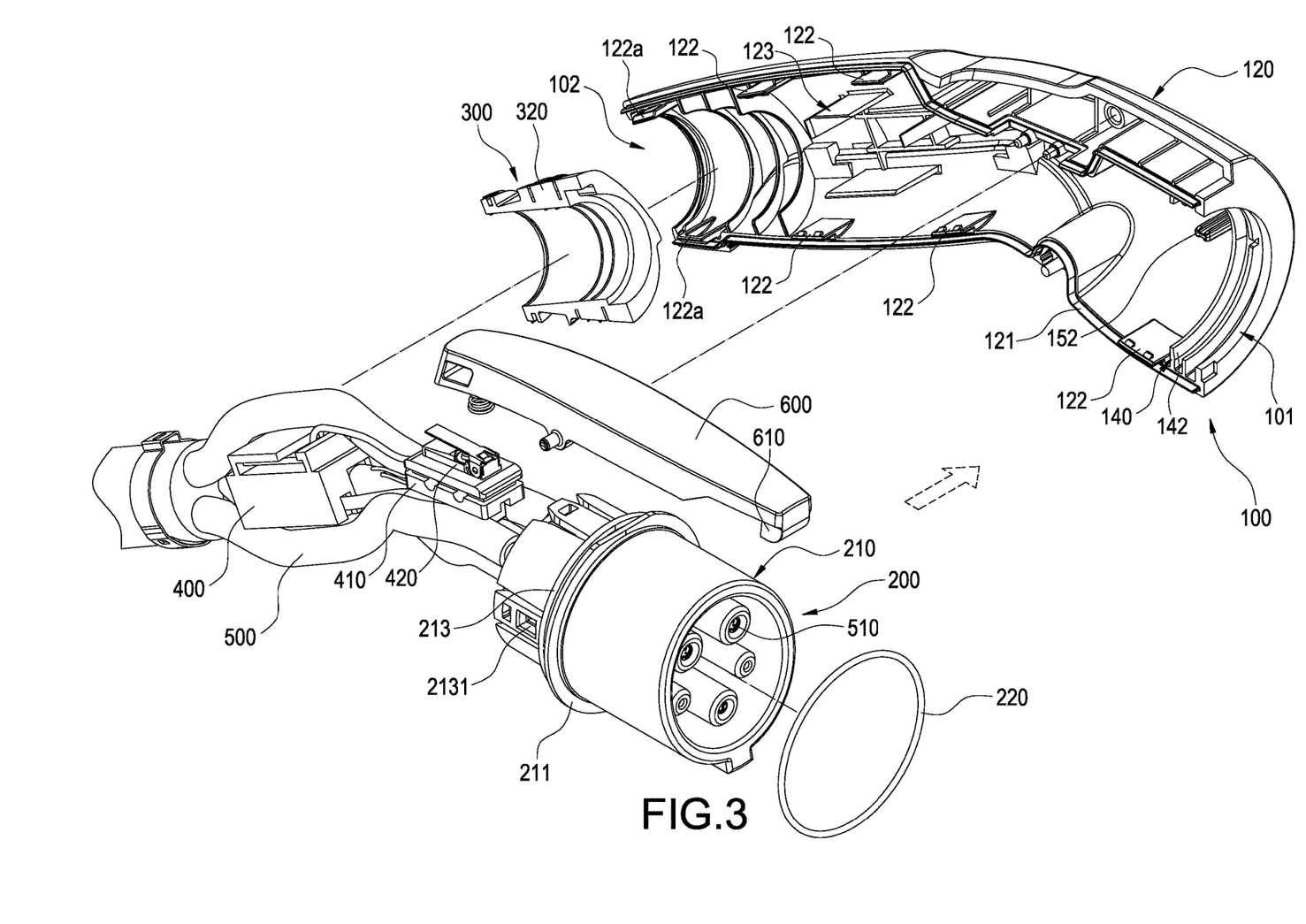
Figure 4:
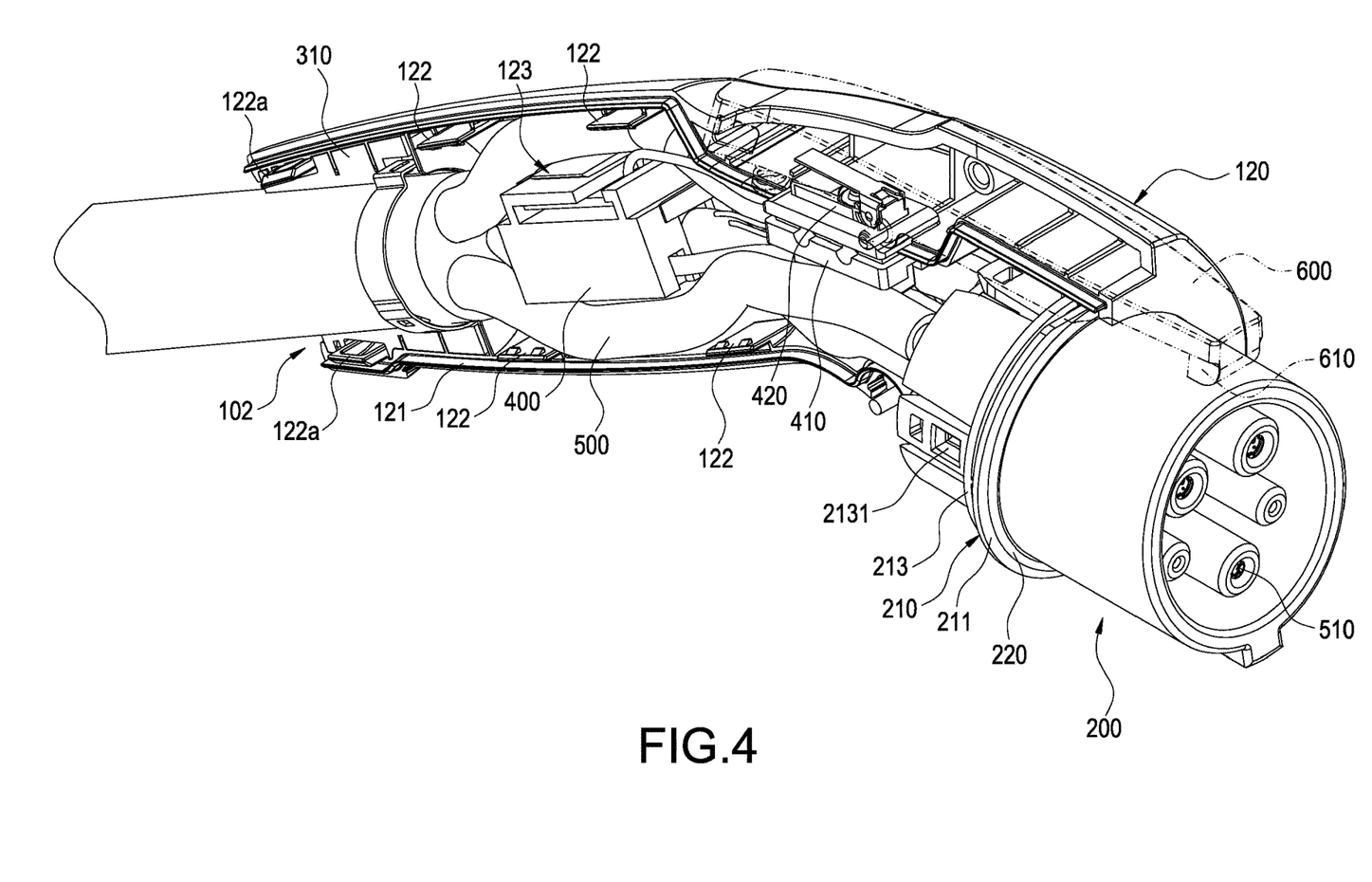
Figure 5:
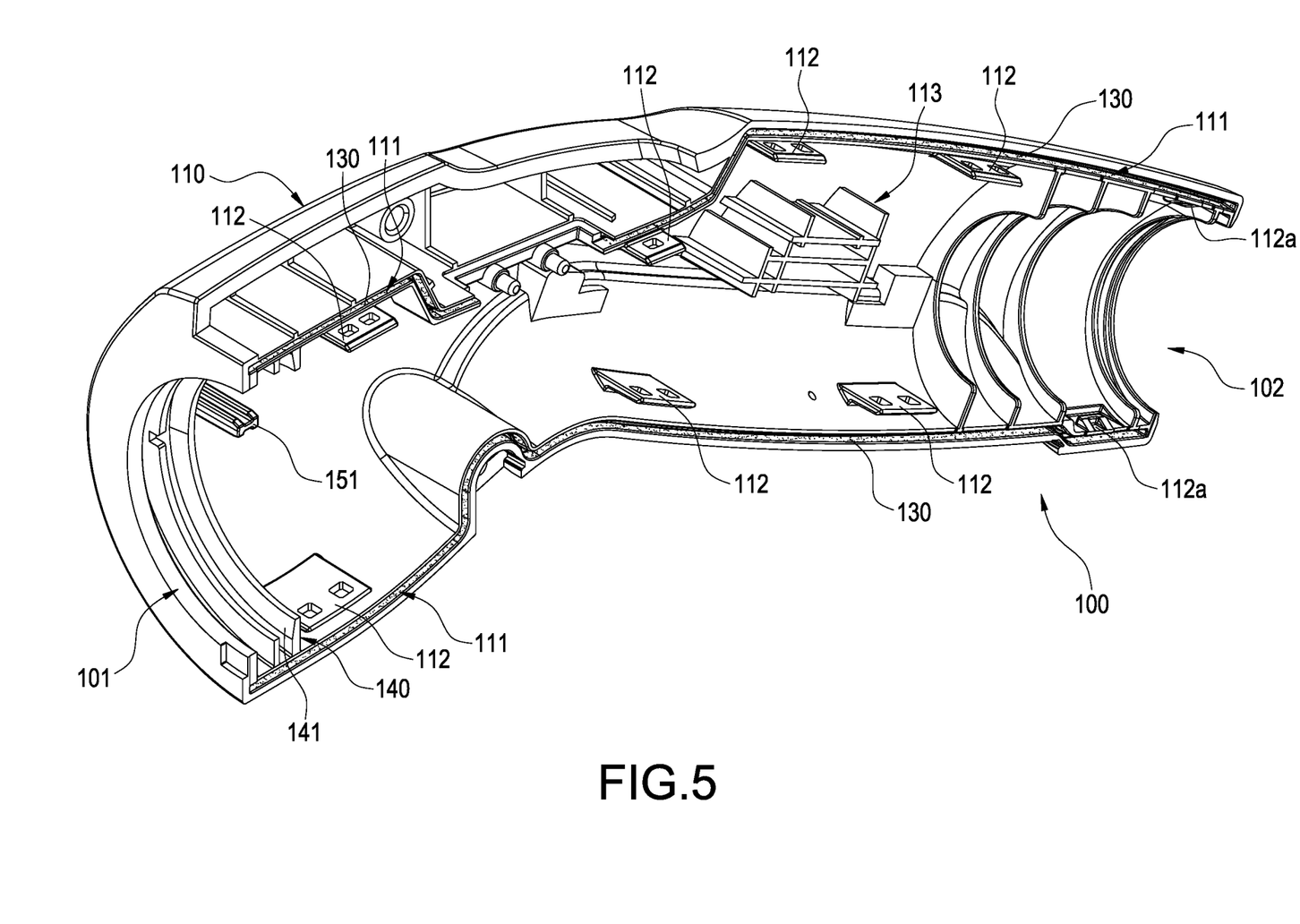

According to this embodiment shown in FIG. 3 to FIG. 5, the grip 100 is in a tubular shape and has a longitudinal direction and a lateral direction. Specifically, a direction passing through a tubular shape, columnar shape or elongated shape object and parallel to a central axis of the object is defined as a longitudinal direction of the object, and a direction passing through the object and perpendicular to the longitudinal direction is defined as a lateral direction of the object. This definition applies to the tubular shape, columnar shape or elongated shape elements recited in the following paragraphs. A front opening 101 is disposed at one end of the grip 100, and a rear opening 102 is disposed at the other end of the grip 100. The grip 100 has a first half-tube 110 and a second half-tube 120 connected with each other along a longitudinal direction of the grip 100. A groove 111 is disposed in the first half-tube 110 and extends along an edge of the first half-tube 110 to connect with a part of the second half-tube 120. At least one first latch portion 112/112a is arranged in the first half-tube 110, and the first latch portion 112/112a is disposed adjacent to the groove 111. A rib 121 is arranged on an edge of the second half-tube 120 and extends along the part connected with the first half-tube 110 on the edge of the second half-tube 120. At least one second latch portion 122/122a is arranged in the second half-tube 120, and the second latch portion 122/122a is disposed adjacent to the rib 121. A sealant 130 (shown later in FIG. 7) is filled in the groove 111. The rib 121 is inserted into the groove 111.

The rib 121 is loosely and substantially matched with the groove 111. The sealant 130 is filled in a gap 103 (shown later in FIG. 7) between the rib 121 and the groove 111. The first latch portion 112/112a and the second latch portion 122/122a are correspondingly latched with each other. According to one preferred embodiment, there can be a plurality of first latch portions 112/112a and a plurality of second latch portions 122/122a corresponding to the first latch portions 112/112a.

Figure 6:
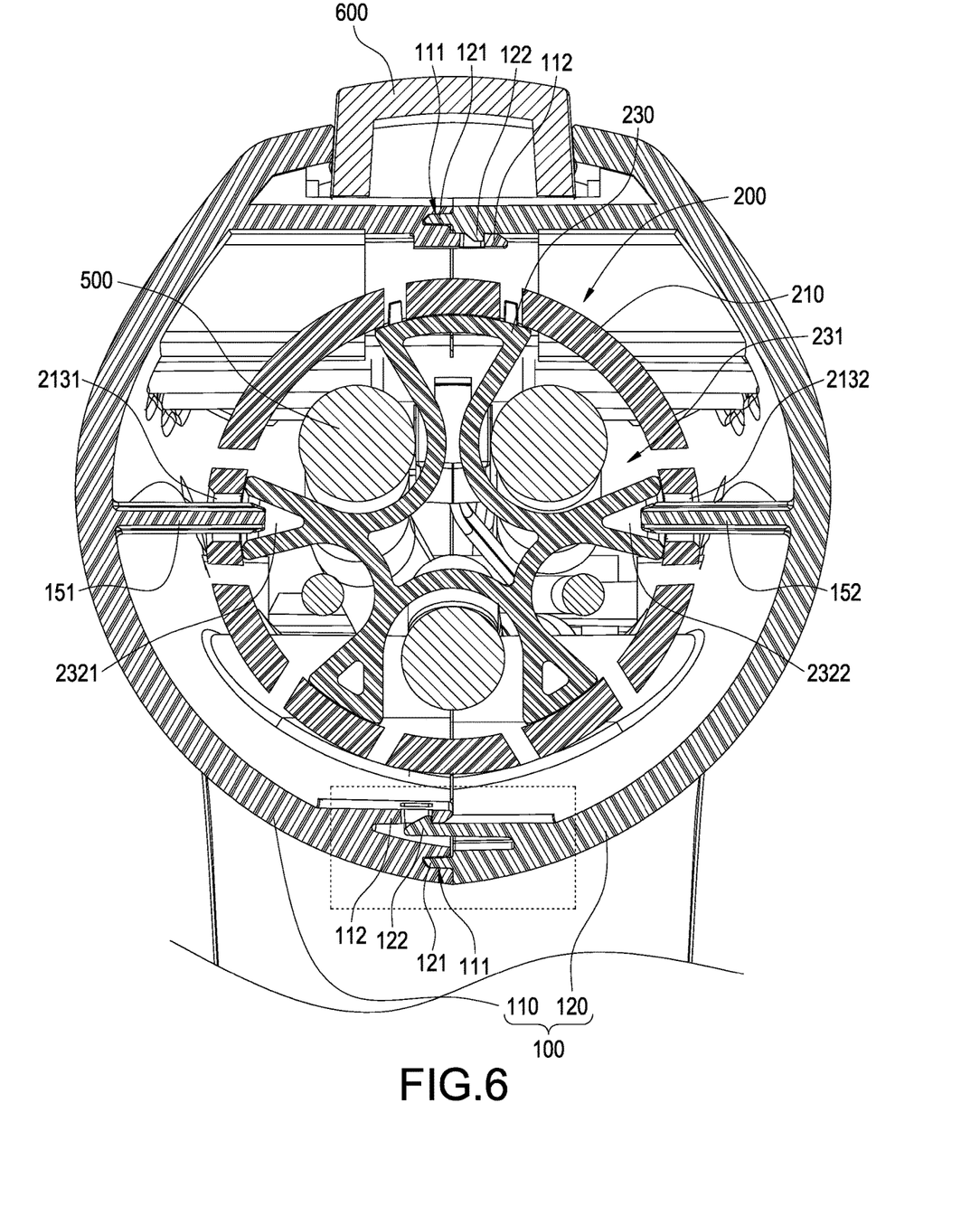
FIG. 6 is a sectional view of the exemplary charging coupler according to the embodiment of this disclosure.

With reference to FIG. 4 to FIG. 6, in one embodiment, the second latch portion 122 is a latch structure, and the corresponding first latch portion 112 is an edge structure or a hole structure for latching with the second latch portion 122 correspondingly. In another embodiment, the first latch portion 112a is a latch structure, and the corresponding second latch portion 122a is an edge structure or a hole structure for latching with the first latch portion 112a correspondingly. The first latch portion 112 (or 112a) is latched with the second latch portion 122 (or 122a) to tighten connection of the first half-tube 110 and the second half-tube 120. Specifically, the first latch portion 112 (or 112a) is latched with the second latch portion 122 (122a) to generate a force on the rib 121 to make the rib 121 squeeze and fall into the sealant 30. Therefore, the sealant 130 is compressed and consolidated so that a gap between the first half-tube 110 and the second half-tube 120 is sealed.

Figure 7:
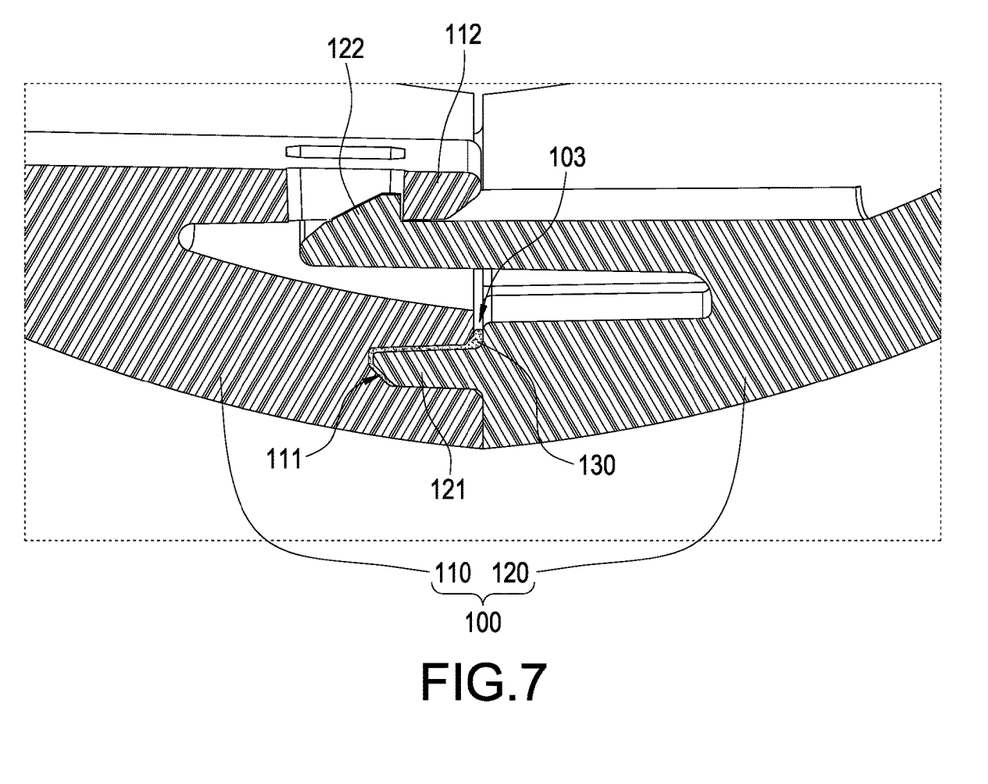
FIG. 7 is a partially enlarged view of FIG. 6.

With reference to FIG. 7, the rib 121 is in contact with an outer side of an inner surface of the groove 111 to seal the groove 111 so that the sealant 130 is prevented from spilling out through an outer surface of the grip 100 when the sealant 130 is squeezed by the rib 121 in assembling process. Moreover, the gap 103 is disposed between the rib 121 and an inner side of the inner surface of the groove 111 to make the excess sealant 130 spill into the grip 100 through the gap 103 rather than onto the outer surface of the grip 100.

With reference to FIG. 2 to FIG. 5, a positioning base 123 protruding from an inner surface of the second half-tube 120 is provided. A controller 400 electrically connected with the electrical connector 200 is arranged on the positioning base 123. Power supply behaviors (e.g.

supplying power or interrupting power) of the electrical connector 200 may be controlled by the controller 400. A pressing block 113 corresponding to the controller 400 and protruding from an inner surface of the first half-tube 110 is provided. The controller 400 is pressed by the pressing block 113 to be fixed on the positioning base 123. The aforementioned structure may facilitate the process of pre-assembling the components into the second half-tube 120. Furthermore, the first half-tube 110 without pre-assembled components can also facilitate the automatic potting and assembling process.

According to this embodiment shown in FIG. 2 and FIG. 4, the charging coupler of this disclosure further has a rubber block 410 and a switch 420. The rubber block 410 is clamped between the first half-tube 110 and the second half-tube 120. The switch 420 penetrates through the rubber block 410. The switch 420 is configured to be partly exposed inside the grip 100 and partly exposed outside the grip 100. The switch 420 is electrically connected with the controller 400.

Figure 8:
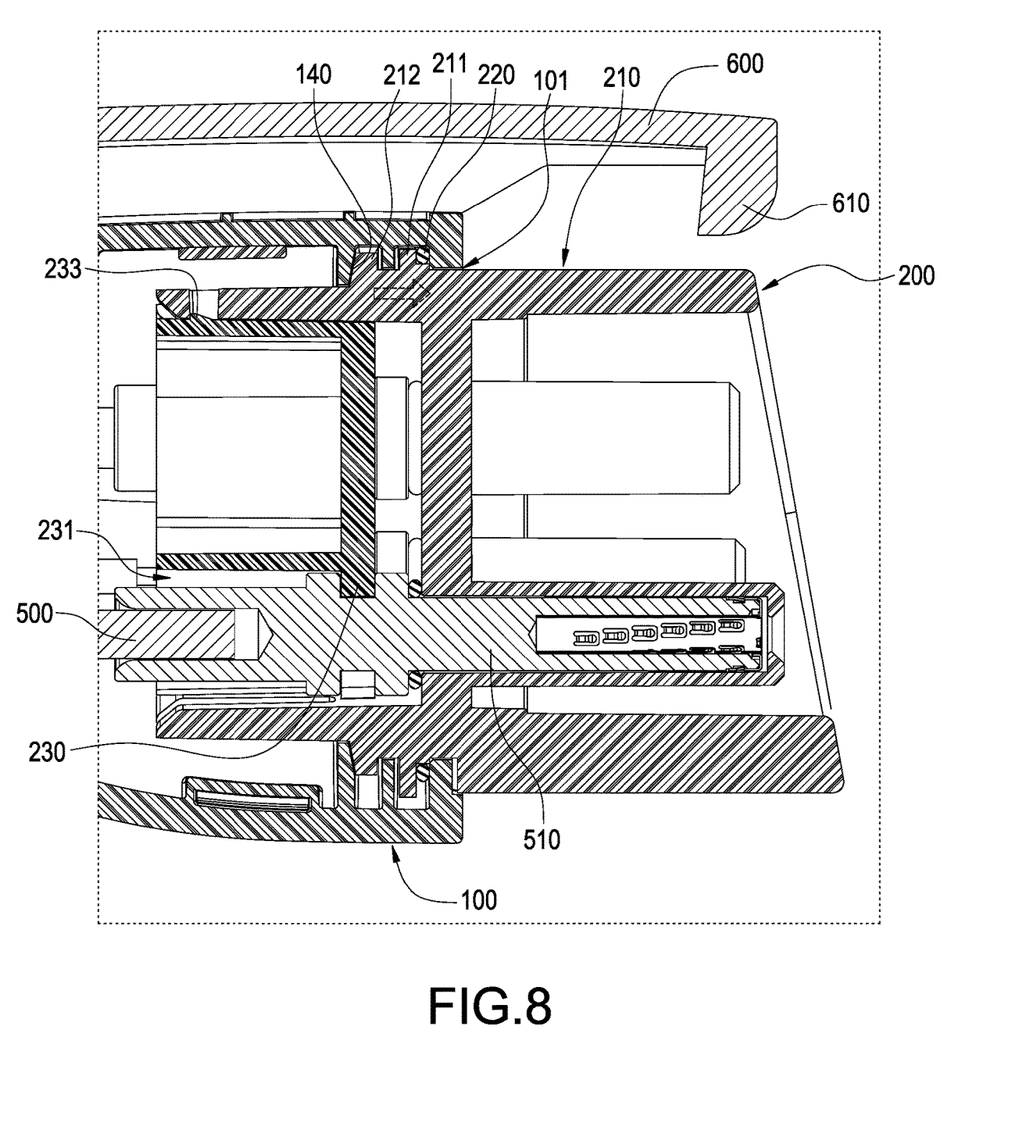
FIG. 8 is a longitudinal partial sectional view showing a front opening of the exemplary charging coupler according to the embodiment of this disclosure.

With reference to FIG. 2 and FIG. 8, a hook 600 is arranged on the grip 100. According to this embodiment, the hook 600 is a bar shape, and a middle segment of the hook 600 is pivotally connected to the outer surface of the grip 100. A claw 610 is formed at one end of the hook 600.

The claw 610 is disposed on a side of the electrical connector 200. The electrical connector 200 may be hooked and latched by the claw 610 when the electrical connector 200 is coupled to a charging receptacle on an electrical car (not shown in Figures). The hook 600 may be pivotally rotated to make the claw 610 move away from the electrical connector 200 and the other end of the hook 600 may press the switch 420. Therefore, the controller 400 may control the power supply behaviors (i.e., supplying power or interrupting power) of the electrical connector 200 by determining a connection status of the electrical connector 200 according to the status of the switch 420.

Figure 9:
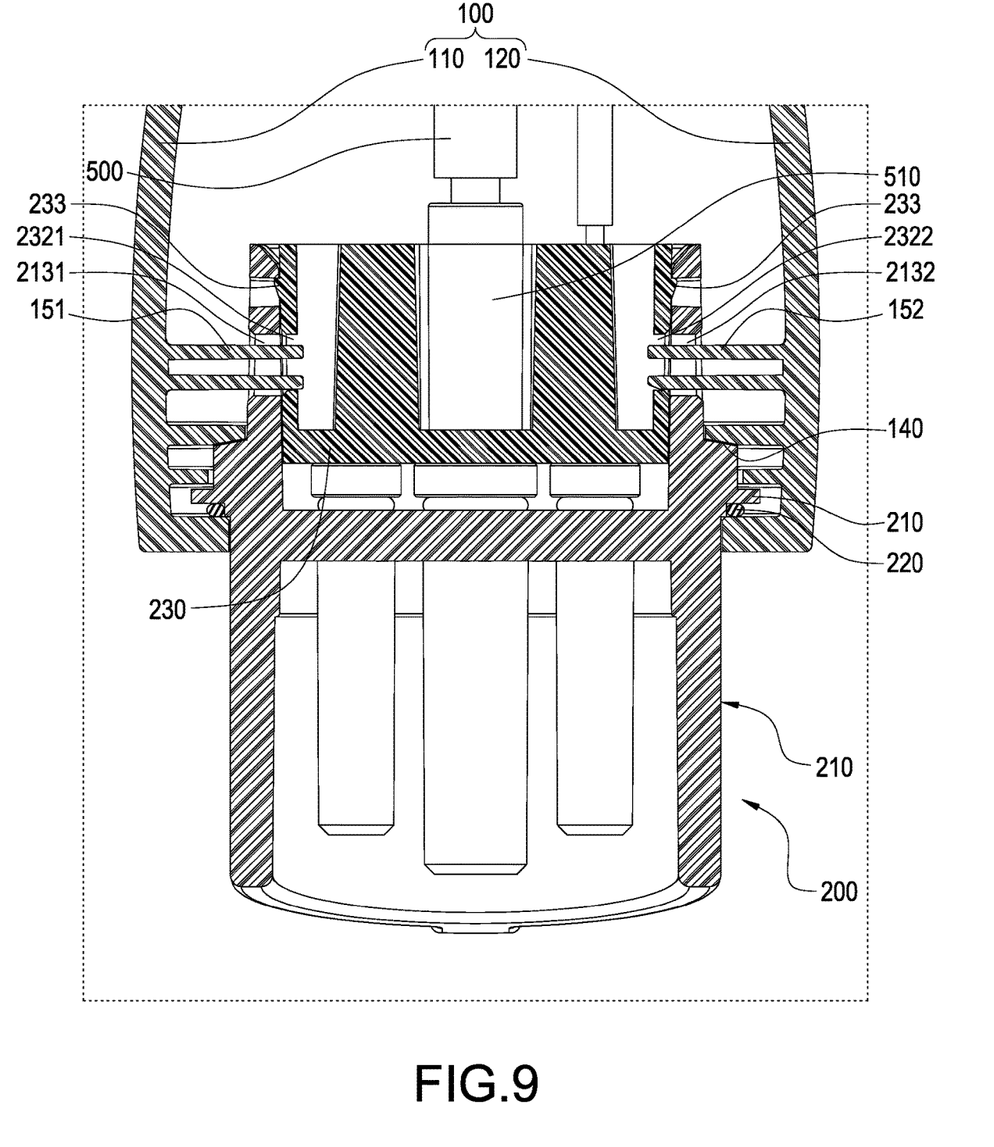
FIG. 9 is another sectional view showing the exemplary charging coupler according to the embodiment of this disclosure.

With reference to FIG. 1 to FIG. 3, the front opening 101 of the grip 100 is closed by the electrical connector 200. Specifically, the electrical connector 200 is inserted in the front opening 101 of the grip 100 to close the front opening 101 of the grip 100. With reference to FIG. 3 to FIG. 5, a tapered ring 212 and a flange 211 are arranged on an outer surface of the electrical connector 200, an inner tapered surface 140 corresponding to the tapered ring 212 is arranged on the inner surface of the grip 100, a rubber ring 220 is arranged between the flange 211 and an inner edge of the front opening 101. According to this embodiment, the inner tapered surface 140 is split into two half-rings 141/142 connected with each other. One half-ring 141 is located on the inner surface of the first half-tube 110, and the other half-ring 142 is located on the inner surface of the second half-tube 120. With reference to FIG. 8, the inner tapered surface 140 is attached on and abuts against the tapered ring 212 to push the flange 211 toward the front opening 101. With reference to FIG. 3, FIG. 5 and FIG. 6, at least one pin 151/152 protruding from the inner surface of the grip 100 is provided. In some embodiments, the number of the pins may be but not limited to two. According to this embodiment, one pin 151 protrudes from the inner surface of the first half-tube 110, the other pin 152 protrudes from the inner surface of the second half-tube 120. Each pin 151/152 is inserted into the electrical connector 200 along the lateral direction of the electrical connector 200. With reference also to FIG. 9, a gap is disposed between the pin 151 of the first half-tube 110 and the electrical connector 200 in a longitudinal direction of the electrical connector 200. The other pin 152 is disposed in a similar way. When the electrical connector 200 is pressed by the deformed rubber ring 220 the gap allows the electrical connector 200 and the grip 100 to shift back and forth relatively along the longitudinal direction of the grip 100.

With reference to FIG. 3 and FIG. 4, the rubber ring 220 is sleeved on the electrical connector 200 before the first half-tube 110 and the second half-tube 120 are assembled. Then, the electrical connector 200 is put into the second half-tube 120 along the lateral direction of the second half-tube 120. In a general assembly process, the first half-tube 110 is assembled to the second half-tube 120 along the direction from the rear opening 102 to the front opening 101 of the grip 100, so only a lateral force can be applied to the electrical connector 200 in the assembly process, and there can't be a force to be applied to the rubber ring 220 toward the front opening 101 to press the rubber ring 220 to seal the front opening 101. Therefore, according to this disclosure shown in FIG. 8, through the inner tapered surface 140 of the second half-tube 120 and the tapered ring 212 of the electrical connector 200, the inner tapered surface 140 and the tapered ring 212 are attached to and abut against each other, so that a resultant force along the longitudinal direction toward the front opening 101 is generated when the electrical connector 200 is assembled to the second half-tube 120. Accordingly, even only the lateral force can be applied to the electrical connector 200 in the assembly process, the aforementioned resultant force can still be applied to the rubber ring 220 via the flange 211 of the electrical connector 200, so that the front opening 101 can be sealed by the resultant force pressing the rubber ring 220 along the longitudinal direction of the grip 100.

With reference to FIG. 2 and FIG. 3, the cable holder 300 is inserted in the rear opening 102 of the grip 100 and thereby the grip 100 is closed. Moreover, an inner edge of the rear opening 102 of the grip 100 is engaged with an outer surface of the cable holder 300, and thereby the rear opening 102 is sealed. This disclosure further has a cable 500 electrically connected to the electrical connector 200. The cable 500 penetrates the cable holder 300 to extend from inside of the grip 100 to outside of the grip 100 for electrically connecting to a power source. According to this embodiment, the cable holder 300 is an elastic cylinder made of rubber, and the cable holder 300 is split along a central axis thereof into two semicircle frames 310/320 connected with each other for the convenience of assembling. One semicircle frame 320 is assembled into the second half-tube 120 in advance, a plurality of cables 500 are then placed into this semicircle frame 320, and then the semicircle frame 320 is connected with the other semicircle frame 310 to form the cable holder 300.

Figure 10:
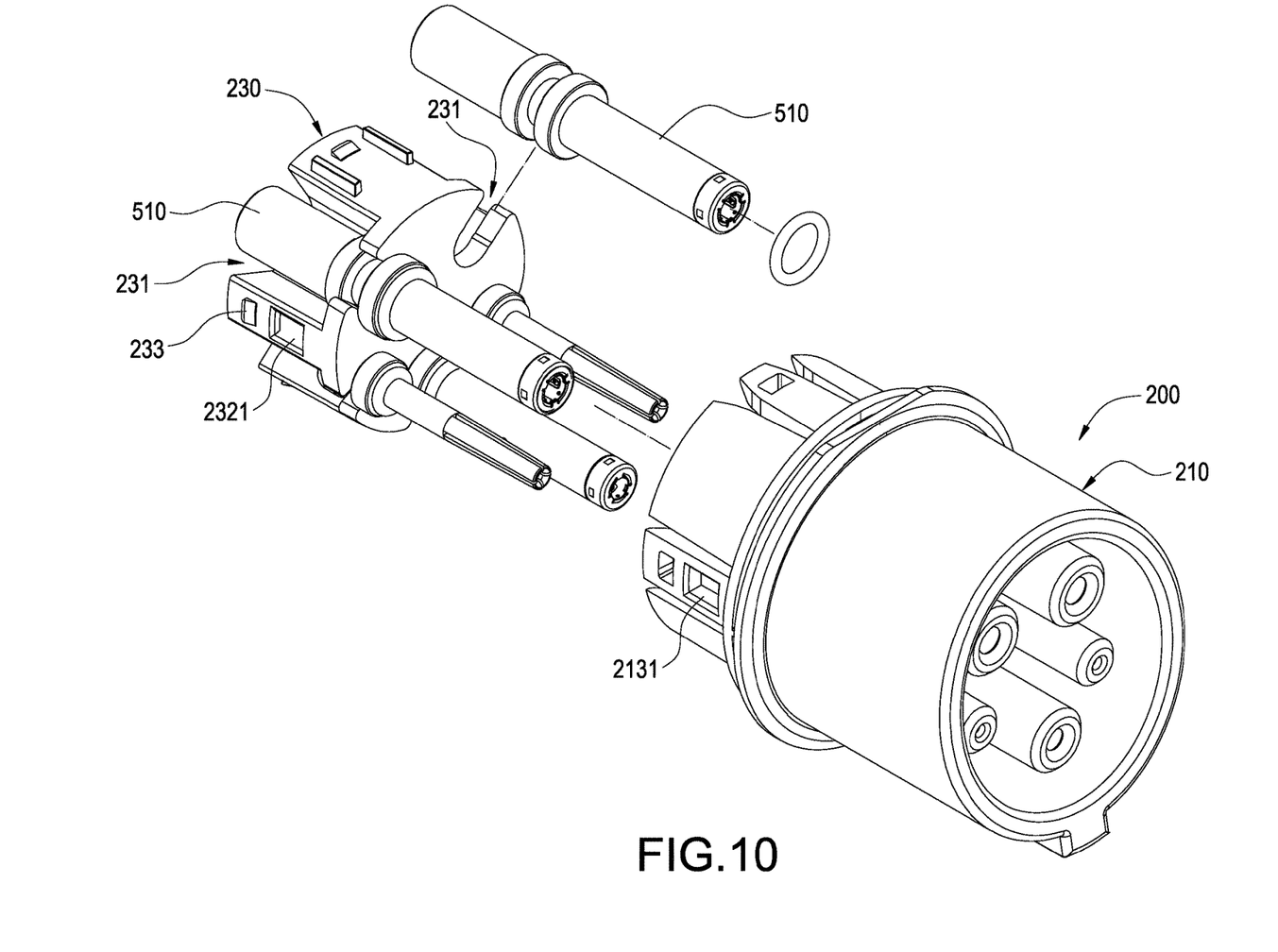
FIG. 10 is an exploded view showing the electrical connector of the exemplary charging coupler according to the embodiment of this disclosure.

According to this embodiment shown in FIG. 9 and FIG. 10, the electrical connector 200 has a sleeve 210 and a terminal holder 230. The terminal holder 230 is in a cylindrical shape and inserted in the sleeve 210. At least one arm latch 233 is arranged on the terminal holder 230. After the terminal holder 230 is inserted into the sleeve 210, the terminal holder 230 may be fixed in the sleeve 210 by latching the sleeve 210 with the arm latch 233. A plurality of positioning notches 231 corresponding to the cables 500 are disposed on an outer surface of the terminal holder 230, and each positioning notch 231 is extended along a longitudinal direction of the terminal holder 230 to penetrate the terminal holder 230. A terminal 510 is arranged at one end of each cable 500 connected to the electrical connector 200, each terminal 510 may be put into each positioning notch 231 in the lateral direction of the terminal holder 230 and thereby fixed on the terminal holder 230.

Furthermore, multiple through holes 2131/2132 are disposed on a lateral surface of the sleeve 210 corresponding to the aforementioned respective pins 151/152. Multiple positioning holes 2321/2322 are disposed on a lateral surface of the terminal holder 230. Each through hole 2131/2132 is aligned to each corresponding positioning hole 2321/2322 respectively. One pin 151 passes through the corresponding through hole 2131 and is inserted into the corresponding positioning hole 2321. Another pin 152 passes through the corresponding through hole 2132 and is inserted into the corresponding positioning hole 2322 in a similar way.

In conclusion, the grip 100 of the charging coupler according to this disclosure is assembled by buckling without screws, and therefore the cost of materials and assembling time comparing to the related rivet or screw assembling are decreased. The groove 111 of the grip 100 is filled with sealant 130, and the sealant 130 is squeezed by the rib 121 inserted into the groove 111 to seal the grip 100. Thus, the waterproof performance of the grip 100 is enhanced. A resultant force is generated toward the front opening 101 through the inner tapered surface 140 and the tapered ring 212 attaching to and abutting against each other during the assembling process. The rubber ring 220 can be pressed by the resultant force to seal the grip 100 for waterproof even only the lateral force can be applied to the electrical connector 200 in the assembling process. In addition, by the aforementioned structures, this disclosure is more suitable for an automatic assembling process and the cost of assembling is decreased.

Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of this disclosure as defined in the appended claims.

What is claimed is:

1. A charging coupler for charging electric vehicles, comprising:
   a grip in a tubular shape, the grip comprising:
   a front opening disposed on one end of the grip,
   a rear opening disposed on the other end of the grip, and
   a first half-tube and a second half-tube connected with each other along a longitudinal direction of the grip,
   an electrical connector, arranged on the front opening of the grip, and a cable holder, arranged on the rear opening of the grip,
   wherein a groove is disposed on the first half-tube, the groove is extended along an edge of the first half-tube and connected with the second half-tube, a first latch portion is arranged in the first half-tube, a rib is arranged in the second half-tube, the rib is extended along an edge of the second half-tube and connected with the first half-tube, a second latch portion is arranged in the second half-tube, the groove is filled with a sealant, the rib is inserted into the groove and substantially matched with the groove, the sealant is filled in a gap between the rib and the groove, and the first latch portion is latched with the second latch portion to tighten connection of the first half-tube and the second half-tube;
   wherein a positioning base is disposed on and protrudes from an inner surface of the second half-tube, and a controller electrically connected to the electrical connector is arranged on the positioning base;
   wherein a pressing block corresponding to the controller is disposed on and protrudes from an inner surface of the first half-tube, and the controller is pressed by the pressing block to be fixed on the positioning base.

2. The charging coupler according to claim 1, further comprising: a rubber block and a switch, the rubber block clamped between the first half-tube and the second half-tube, the switch embedded in the rubber block and penetrating the rubber block to be exposed partly inside the grip and further partly exposed outside the grip, and the switch is electrically connected with the controller.

3. The charging coupler according to claim 2, wherein a hook is arranged on the grip, and a middle segment of the hook is pivotally connected on an outer surface of the grip; a claw is disposed at one end of the hook and arranged on a side of the electrical connector, and the other end of the hook presses the switch when the hook is pivotally rotated to make the claw move away from the electrical connector.

4. The charging coupler according to claim 1, wherein a tapered ring and a flange are arranged on an outer surface of the electrical connector, and an inner tapered surface corresponding to the tapered ring is arranged on an inner surface of the grip; a rubber ring is disposed between the flange and an inner edge of the front opening, and the inner tapered surface is attached on and abuts against the tapered ring to push the flange toward the front opening.

5. The charging coupler according to claim 4, wherein a pin is disposed on and protrudes from the inner surface of the grip, the pin is inserted into the electrical connector along a lateral direction of the electrical connector, and a gap is disposed between the pin and the electrical connector in a longitudinal direction of the electrical connector.

6. The charging coupler according to claim 4, wherein one half of the inner tapered surface is located on an inner surface of the first half-tube, the other half of the inner tapered surface is located on an inner surface of the second half-tube.

7. The charging coupler according to claim 1, wherein the rib is in contact with an outer side of an inner surface of the groove.

8. The charging coupler according to claim 7, wherein the gap is disposed between the rib and an inner side of the inner surface of the groove.

9. The charging coupler according to claim 1, wherein an inner edge of the rear opening of the grip is engaged with an outer surface of the cable holder.

10. The charging coupler according to claim 9, further comprising: a cable electrically connected to the electrical connector and penetrating through the cable holder and extending from inside of the grip to outside of the grip.

11. The charging coupler according to claim 10, comprising a plurality of cables, wherein the electrical connector comprises a sleeve and a terminal holder inserted in the sleeve; a plurality of positioning notches corresponding to the cables are disposed on an outer surface of the terminal holder; a plurality of terminals are respectively disposed on the cables, and each of the terminals is arranged correspondingly in each of the positioning notches.

12. The charging coupler according to claim 11, wherein at least one arm latch is arranged on the terminal holder to latch the sleeve.

13. The charging coupler according to claim 11, wherein a pin is disposed on and protrudes from an inner surface of the grip, and the pin penetrates through the sleeve to be inserted to the terminal holder along a lateral direction of the electrical connector.

14. The charging coupler according to claim 1, wherein the first latch portion is disposed adjacent to the groove, and the second latch portion is disposed adjacent to the rib.

* * * * *